US011349295B2

(12) United States Patent
Nakaguchi et al.

(10) Patent No.: US 11,349,295 B2
(45) Date of Patent: May 31, 2022

(54) POWER SUPPLY CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shinnosuke Nakaguchi, Yokkaichi (JP); Masayuki Kato, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/253,184

(22) PCT Filed: Jun. 10, 2019

(86) PCT No.: PCT/JP2019/022858

§ 371 (c)(1),
(2) Date: Dec. 17, 2020

(87) PCT Pub. No.: WO2020/003984

PCT Pub. Date: Jan. 2, 2020

(65) Prior Publication Data

US 2021/0273439 A1 Sep. 2, 2021

(30) Foreign Application Priority Data

Jun. 25, 2018 (JP) ............................ JP2018-120097

(51) Int. Cl.
*H02H 3/00* (2006.01)
*H02H 3/08* (2006.01)
*H02H 1/00* (2006.01)

(52) U.S. Cl.
CPC ............ *H02H 3/08* (2013.01); *H02H 1/0007* (2013.01)

(58) Field of Classification Search
CPC ............................... H02H 3/08; H02H 1/0007
(Continued)

(56) References Cited

U.S. PATENT DOCUMENTS 3,328,693 A * 6/1967 Yarbrough ......... G01R 31/2632 324/764.01
10,566,663 B2 2/2020 Sugisawa
(Continued)

FOREIGN PATENT DOCUMENTS

| | | | |
|---|---|---|---|
| CN | 2737044 Y | | 10/2005 |
| EP | 2 955 848 | * | 12/2015 |
| JP | H10-40563 A | | 2/1998 |

OTHER PUBLICATIONS

International Search Report, Application No. PCT/JP2019/022858, dated Jul. 2, 2019. ISA/Japan Patent Office.

*Primary Examiner* — Jared Fureman
*Assistant Examiner* — Lucy M Thomas
(74) *Attorney, Agent, or Firm* — Honigman LLP

(57) ABSTRACT

In a power supply control device, a switching device turns a main switch on or off to control supply of power via the main switch. When a battery supplies power to the switching device, a fuse is disposed in a first current path of an output current output from the switching device. A diode is disposed in a second current path of the output current different from the first current path. If a current flowing through the fuse increases to or above a first threshold, the fuse blows. If a current flowing through the diode increases to or above a second threshold, the diode blows.

6 Claims, 5 Drawing Sheets

1
11
Power Supply Control Device
21
20
Switching Device
10
22
23
W1
W2
12
L1
L2
Load
13

(58) Field of Classification Search
USPC .......................................................... 361/87
See application file for complete search history.

(56) References Cited

U.S. PATENT DOCUMENTS

| | | | | |
|---|---|---|---|---|
| 2005/0140345 | A1* | 6/2005 | Iwabuki .................. | B60L 58/32<br>323/268 |
| 2011/0175699 | A1* | 7/2011 | Huss ...................... | H01H 85/32<br>337/143 |
| 2018/0351213 | A1 | 12/2018 | Sugisawa | |

* cited by examiner

POWER SUPPLY CONTROL DEVICE

CROSS-REFERENCE TO RELATED APPLICATIONS

This application is the U.S. national stage of PCT/JP2019/022858 filed on Jun. 10, 2019, which claims priority of Japanese Patent Application No. JP 2018-120097 filed on Jun. 25, 2018, the contents of which are incorporated herein.

TECHNICAL FIELD

The present disclosure relates to a power supply control device.

BACKGROUND

JP 2017-131021A discloses a power supply control device for vehicles that controls supply of power from a battery to a load. In this power supply control device, the supply of power from the battery to the load is controlled by turning on and off a switch provided in a power supply path where power is supplied from the battery to the load.

A switching device configured to turn the switch on and off is connected to a positive electrode of the battery and is grounded. A current flows from the battery to the switching device in this order. This achieves supply of power from the battery to the switching device.

In the conventional power supply control device disclosed in JP 2017-131021A, a switching device is connected to a conductor, such as a vehicle body, and is thereby grounded. If the switching device and the conductor are disconnected from each other while a battery supplies power to a load, the supply of power from the battery to the load is stopped, and the switching device stops operating. In response, a switch is turned off, which may stop the load to suddenly stop operating.

Accordingly, one object is to provide a power supply control device having less possibility of stopping supply of power to a switching device.

SUMMARY

A power supply control device according to one aspect of the present disclosure is a power supply control device configured to turn a switch on or off to control power supply via the switch. The power supply control device includes a switching device configured to turn the switch on or off, a first fuse portion that is disposed in a first current path of an output current output from the switching device when power is supplied to the switching device, and is configured to blow if a current flowing therethrough increases to or above a first threshold, and a second fuse portion that is disposed in a second current path of the output current different from the first current path, and is configured to blow if a current flowing therethrough increases to or above a second threshold. The second fuse portion includes a diode.

Effects of the Disclosure

With the present disclosure, there is less possibility of stopping supply of power to a switching device.

DETAILED DESCRIPTION OF PREFERRED EMBODIMENTS

Figure 1:
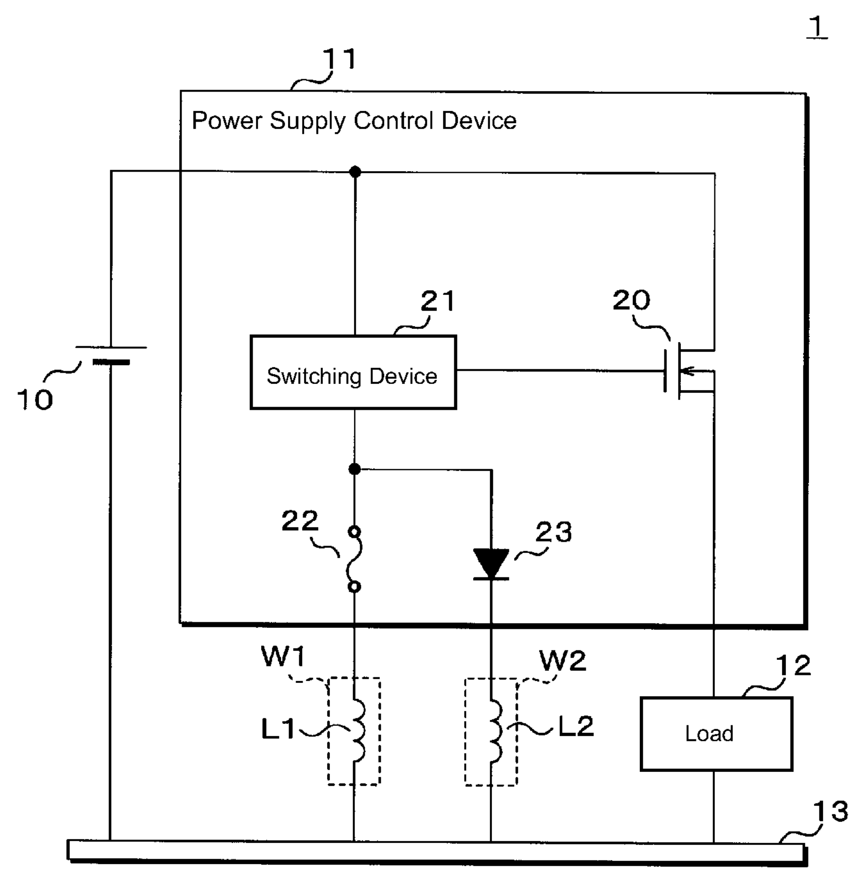
FIG. 1 is a circuit diagram of a power supply system according to one embodiment.

Initially, embodiments of the present disclosure will be listed and described. At least some parts of the embodiments described below may be freely combined.

A power supply control device according to one aspect of the present disclosure is a power supply control device for controlling power supply via a switch by turning the switch on or off. The power supply control device includes a switching device configured to turn the switch on or off, a first fuse portion that is disposed in a first current path of an output current output from the switching device when power is supplied to the switching device, and is configured to blow if a current flowing therethrough increases to or above a first threshold, and a second fuse portion that is disposed in a second current path of the output current different from the first current path, and is configured to blow if a current flowing therethrough increases to or above a second threshold. The second fuse portion includes diodes.

According to the aspect described above, if a current flow through the first current path is stopped, an output current flows through the second current path. If a current flow through the second current path is stopped, an output current flows through the first current path. This leads to less possibility of stopping supply of power to the switching device.

The first current path includes a conducting wire arranged therein, for example, the conducting wire having an inductor component. In this case, if a current flowing through the first current path increases, the conducting wire generates a surge voltage. Since the output current from the switching device flows through the first current path and the second current path, a freewheeling current path is formed where the current flows from one end of the conducting wire to the first fuse portion, the diode, and the other end of the conducting wire in this order. Consequently, the surge voltage is suppressed to a small value or less. Moreover, the first fuse portion and the second fuse portion are disposed in the first current path and the second current path, respectively, leading to prevention of overcurrent to the switching device.

In the power supply control device according to one aspect of the present disclosure, if a current flowing via the second fuse portion increases to or above the second threshold, the diode blows.

In the aspect described above, if a current flowing via the second fuse portion increases to or above the second threshold, the diode blows. Since the diode has a blowout function, the number of components constituting the device is small, achieving a reduction in size of the device.

In the power supply control device according to one aspect of the present disclosure, a voltage between opposite ends of the first fuse portion when the output current flows through the first current path is lower than a voltage between opposite ends of the diode when a current flows through the diode in a forward direction.

In the aspect described above, the voltage between the opposite ends of the first fuse portion is lower than the voltage between both ends of the diode. Accordingly, the output current typically flows through the first current path, and the voltage at an output terminal from which the output current is output is low in the switching device. If a current flowing through the first current path is stopped, the output current flows through the second current path.

In the power supply control device according to one aspect of the present disclosure, a first conducting wire and a second conducting wire are arranged in the first current path and the second current path, respectively, and an inductive component of the first conducting wire is larger than an inductor component of the second conducting wire.

In the aspect described above, the inductive component of the first conducting wire is larger than an inductive component of the second conducting wire, and accordingly, there is a high possibility that a current flows through the freewheeling current path described above. This enhances the effect of suppressing the surge voltage.

Specific examples of a power supply system concerning the embodiments of the present disclosure are hereinafter described with reference to the drawings. It should be understood that the present invention is not limited to the following examples, but is intended to encompass all variations and modifications indicated by, equivalent to, and falling within the appended claims.

FIG. 1 is a circuit diagram of a power supply system 1 according to one embodiment. The power supply system 1 is suitably installed in a vehicle, and includes a battery 10, a power supply control device 11, a load 12, a conductor 13, a first conducting wire W1, and a second conducting wire W2. The first conducting wire W1 and the second conducting wire W2 each include an inductive component. An equivalent circuit of the first conducting wire W1 is indicated as a first inductor L1. An equivalent circuit of the second conducting wire W2 is indicated as a second inductor L2. The inductance of the first inductor L1 corresponds to the inductive component of the first conducting wire W1. The inductance of the second inductor L2 corresponds to the inductive component of the second conducting wire W2. The conductor 13 is, for example, a vehicle body. Connection to the conductor 13 corresponds to grounding (connecting to ground), The power supply control device 11 includes a main switch 20, a switching device 21, a fuse 22, and a diode 23. The main switch 20 is an N-channel field effect transistor (FET).

The positive electrode of the battery 10 is connected to the drain of the main switch 20. The source of the main switch 20 is connected to one end of the load 12. The negative electrode of the battery 10 and the other end of the load 12 are connected to the conductor 13. The switching device 21 is connected to the drain and the gate of the main switch 20 individually. The switching device 21 is also connected to one end of the fuse 22.

The other end of the fuse 22 is connected to one end of the first inductor L1 of the first conducting wire W1. The other end of the first inductor L1 is connected to the conductor 13. The one end of the fuse 22 is also connected to the anode of the diode 23. The cathode of the diode 23 is connected to one end of the second inductor L2 of the second conducting wire W2. The other end of the second inductor L2 is connected to the conductor 13.

If a gate voltage of the main switch 20 with respect to a source potential is equal to or higher than an on-voltage, a current can flow via the drain and the source. At this time, the main switch 20 is in an on state. If the gate voltage of the main switch 20 with respect to a source potential is lower than an off-voltage, no current flows via the drain and the source. At this time, the main switch 20 is in an off state. Here, the on-voltage exceeds the off-voltage.

The battery 10 supplies power to the switching device 21. When the battery 10 supplies power to the switching device 21, the switching device 21 receives a current from the positive electrode of the battery 10. The current that the switching device 21 receives is output from an output terminal of the switching device 21 where the one end of the fuse 22 and the anode of the diode 23 are connected. The output current from the output terminal of the switching device 21 when the battery 10 supplies power to the switching device 21 flows to the fuse 22, the first conducting wire W1, the conductor 13, and the battery 10 in this order, or to the diode 23, the second conducting wire W2, the conductor 13, and the battery 10 in this order.

The current path of the output current flowing through the fuse 22 and the first conducting wire W1 corresponds to the first current path. The current path of the output current flowing through the diode 23 and the second conducting wire W2 corresponds to the second current path. Accordingly, the fuse 22 and the first conducting wire W1 are arranged in the first current path. The diode 23 and the second conducting wire W2 are arranged in the second current path.

The switching device 21 operates with use of the power supplied from the battery 10. The switching device 21 turns the main switch 20 on or off.

If the switching device 21 turns the main switch 20 on, the switching device 21 raises the output voltage of the battery 10 with respect to the potential at the output terminal, and outputs the raised voltage to the gate of the main switch 20. This raises the gate voltage of the main switch 20 with respect to the source potential to or above the on-voltage, and the main switch 20 turns on. If the switching device 21 turns off the main switch 20, the switching device 21 stops raising the voltage and stops output of the raised voltage to the gate of the main switch 20. Accordingly, the gate voltage of the main switch 20 is lowered with respect to the source potential to less than the off-voltage, and the main switch 20 turns off.

If the switching device 21 turns on the main switch 20, the battery 10 supplies power to the load 12 via the main switch 20. The load 12 corresponds to an electric device installed in a vehicle. The load 12 operates while power is supplied from the battery 10 to the load 12. If the switching device 21 turns off the main switch 20, supply of power from the battery 10 to the load 12 is stopped. If the supply of power from the battery 10 to the load 12 is stopped, the load 12 stops its operation.

As described above, in the power supply control device 11, the switching device 21 turns the main switch 20 on or off to control the supply of power via the main switch 20. When the battery 10 supplies power to the switching device 21, the switching device 21 continuously outputs an output current from its output terminal.

If a current flowing through the fuse 22 increases to or above the first threshold, the fuse 22 blows. The fuse 22 functions as a first fuse portion.

If a current flowing from the anode to the cathode in this order increases to or above the second threshold in the diode 23, the diode 23 blows. The diode 23 functions as a second fuse portion.

Figure 2:
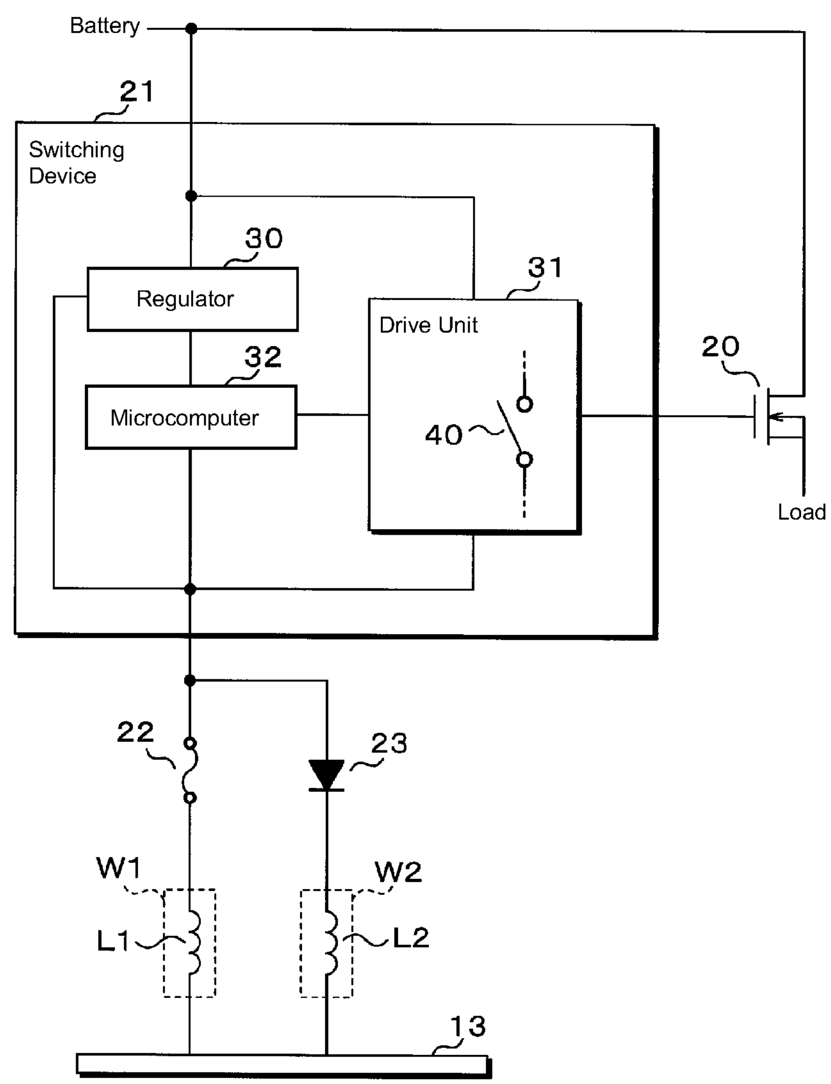
FIG. 2 is a block diagram showing a main configuration of a switching device.

FIG. 2 is a block diagram showing a main configuration of the switching device 21. The switching device 21 includes a regulator 30, a drive unit 31, and a microcomputer 32. The regulator 30 and the drive unit 31 are connected to the drain of the main switch 20. The regulator 30 is also connected to the microcomputer 32. The microcomputer 32 is also connected to the drive unit 31. The drive unit 31 is also connected to the gate of the main switch 20. The regulator 30, the drive unit 31, and the microcomputer 32 are also connected to one end of the fuse 22. Here, the potential of a connection node connecting the regulator 30, the drive unit 31, and the microcomputer 32 corresponds to the potential at the output terminal of the switching device 21.

The battery 10 supplies power to the regulator 30. When the battery 10 supplies power to the regulator 30, a current flows through the positive electrode of the battery 10, the regulator 30, and the output terminal of the switching device 21 in this order. If the battery 10 supplies power to the regulator 30, the regulator 30 operates. If the battery 10 stops supply of power to the regulator 30, the regulator 30 stops its operation.

If the output voltage of the battery 10 with respect to the potential at the output terminal of the switching device 21 exceeds a target voltage, the regulator 30 lowers the output voltage of the battery 10 with respect to the potential at the output terminal of the switching device 21 to the target voltage, and outputs the lowered voltage (target voltage) to the microcomputer 32. The target voltage is constant and is preset. If the output voltage of the battery 10 with respect to the potential at the output terminal of the switching device 21 is equal to or less than the target voltage, the regulator 30 outputs the output voltage of the battery 10 directly to the microcomputer 32.

When the regulator 30 outputs a voltage to the microcomputer 32, power is supplied to the microcomputer 32. When the battery 10 supplies power to the microcomputer 32 via the regulator 30, a current flows from the positive electrode of the battery 10 to the regulator 30, the microcomputer 32, and the output terminal of the switching device 21 in this order. If the voltage output from the regulator 30 to the microcomputer 32 is equal to or higher than a constant voltage, the microcomputer 32 operates. If the voltage output from the regulator 30 to the microcomputer 32 is less than the constant voltage, the microcomputer 32 stops its operation.

The battery 10 supplies power also to the drive unit 31. When the battery 10 supplies power to the drive unit 31, a current flows from the positive electrode of the battery 10 to the drive unit 31 and the output terminal of the switching device 21 in this order. Here, the current output from the regulator 30, the drive unit 31, and the microcomputer 32 flows via the output terminal of the switching device 21.

The microcomputer 32 outputs a high-level voltage and a low-level voltage to the drive unit 31. When the microcomputer 32 outputs the high-level voltage to the drive unit 31, the drive unit 31 raises the output voltage of the battery 10 with respect to the potential at the output terminal of the switching device 21, and outputs the raised voltage to the gate of the main switch 20. When the drive unit 31 outputs the raised voltage to the gate of the main switch 20, the voltage of the gate with respect to the source potential is equal to or higher than the on-voltage of the main switch 20, and the main switch 20 is in an on state.

When the microcomputer 32 outputs the low-level voltage to the drive unit 31, the drive unit 31 stops raising the voltage, and thus outputs no voltage to the gate of the main switch 20. When the drive unit 31 outputs no voltage to the gate of the main switch 20, the voltage of the gate with respect to the source potential is less than the off-voltage of the main switch 20, and the main switch 20 is in an off state.

If the microcomputer 32 switches the voltage, output to the drive unit 31, from the low-level voltage to the high-level voltage, the drive unit 31 causes the main switch 20 to turn on from off. If the microcomputer 32 switches the voltage, output to the drive unit 31, from the high-level voltage to the low-level voltage, the drive unit 31 causes the main switch 20 to turn off from on.

The drive unit 31 has one or more sub-switches 40. The one or more sub-switches 40 each turn on from off, and vice versa, repeatedly while the drive unit 31 operates. When the one or more sub-switches 40 perform switching, the output current from the output terminal of the switching device 21 changes.

The maximum voltage between the opposite ends of the fuse 22 when the output current flows through the first current path where the fuse 22 is arranged is less than the minimum value voltage between the opposite ends of the diode 23 when the current flows through the anode and the cathode in this order (hereinafter, referred to as "forward voltage"). That is, the fuse 22 has a sufficiently low resistance value. Accordingly, the output current from the output terminal of the switching device 21 typically flows through the first current path, and the voltage at the output terminal of the switching device 21 with respect to the potential of the conductor 13 is low. As is described later, if a current flow through the first current path is stopped, the output current flows through the second current path where the diode 23 is arranged.

If the current flowing through the first current path increases, the first inductor L1 of the first conducting wire W1 generates a surge voltage. At this time, the voltage at the first conducting wire W1 on the side adjacent to the fuse 22 with respect to the potential at its end adjacent to the conductor 13 is raised. This raises the voltage at the output terminal of the switching device 21 with respect to the potential of the conductor 13. The negative electrode of the battery 10 is connected to the conductor 13. Consequently, if the voltage at the output terminal of the switching device 21 with respect to the potential of the conductor 13 is raised, the maximum voltage that the battery 10 can apply to the microcomputer 32 is lowered to a voltage calculated by subtracting the surge voltage from the output voltage of the battery 10.

The output voltage of the battery 10 changes depending on the magnitude of the current output from the battery 10. If the voltage at the output terminal of the switching device 21 with respect to the potential of the conductor 13 is raised considerably when the output voltage of the battery 10 is low, the maximum voltage that the battery 10 can apply to the microcomputer 32 is less than the constant voltage described above. In this case, the microcomputer 32 stops its operation.

If the microcomputer 32 stops its operation, the drive unit 31 stops operation and the main switch 20 turns off. This stops the power supply from the battery 10 to the load 12, and causes the load 12 to stop suddenly. In order to prevent an inadvertent stop of operation of the microcomputer 32, it is necessary to suppress the raise of the voltage at the output terminal of the switching device 21 with respect to the potential of the conductor 13, i.e., to suppress the surge voltage.

Also, if a current flowing through the first current path decreases, the first inductor L1 of the first conducting wire W1 generates a surge voltage. At this time, the voltage at the first conducting wire W1 on the side adjacent to the fuse 22 with respect to a potential on its end adjacent to the conductor 13 is lowered. This lowers the voltage at the output terminal of the switching device 21 with respect to the potential of the conductor 13. If the voltage at the output terminal of the switching device 21 with respect to the potential of the conductor 13 is lowered, the maximum voltage that the battery 10 can apply to the microcomputer 32 is raised to a voltage calculated by adding the surge voltage to the output voltage of the battery 10. Accordingly, the microcomputer 32 does not stop its operation when the current that flows through the first current path decreases.

The following describes effects that can be obtained by providing the first current path where the fuse 22 is arranged and the second current path where the diode 23 is arranged.

Figure 3:
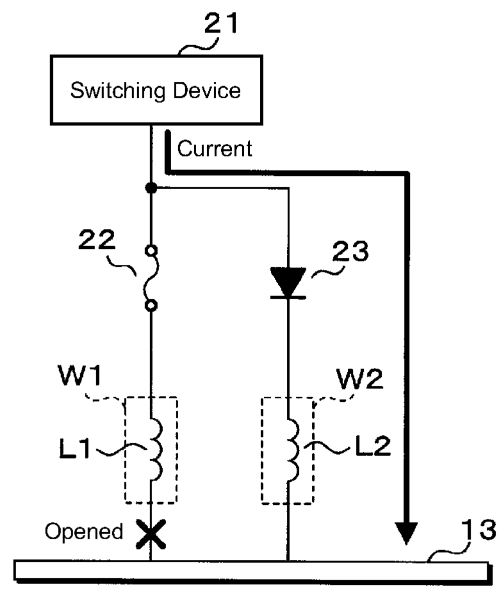
FIG. 3 is a diagram showing the current supply in a state in which a first conducting wire is opened.

FIG. 3 is a diagram showing current supply in a state in which the first conducting wire W1 is opened. For example, when the first conducting wire W1 and the conductor 13 are disconnected, one end of the first conducting wire W1 adjacent to the conductor 13 is opened as shown in FIG. 3. If the one end of the first conducting wire W1 adjacent to the conductor 13 is opened, the current flow through the first current path stops. In this case, the output current from the output terminal of the switching device 21 flows through the second current path where the diode 23 is arranged. Accordingly, the supply of power from the battery 10 to the switching device 21, i.e., to the regulator 30, the drive unit 31, and the microcomputer 32 is performed continuously.

Also, if a current flow through the first current path is stopped due to a reason other than opening of the one end of the first conducting wire W1 adjacent to the conductor 13, the output current from the output terminal of the switching device 21 flows through the second current path. Accordingly, the supply of power from the battery 10 to the switching device 21 is performed continuously.

Figure 4:
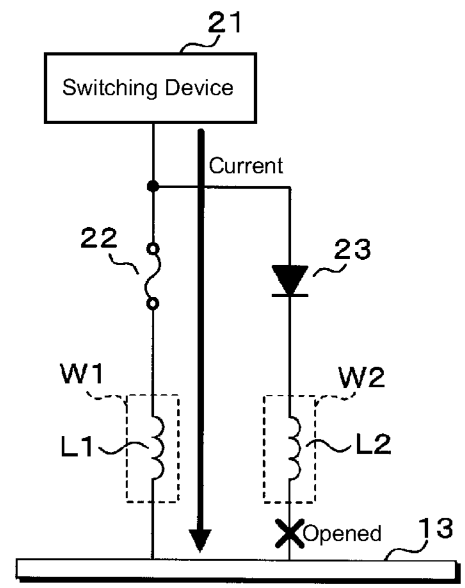
FIG. 4 is a diagram showing the current supply in a state in which a second conducting wire is opened.

FIG. 4 is a diagram showing current supply in a state in which the second conducting wire W2 is opened. For example, when the second conducting wire W2 and the conductor 13 are disconnected, one end of the second conducting wire W2 adjacent to the conductor 13 is opened as shown in FIG. 4. If the one end of the second conducting wire W2 adjacent to the conductor 13 is opened, the current flow through the second current path stops. In this case, the output current from the output terminal of the switching device 21 flows continuously through the first current path where the fuse 22 is arranged. Accordingly, the supply of power from the battery 10 to the switching device 21 is performed continuously.

Also, if the current flow through the second current path is stopped due to a reason other than opening of the one end of the second conducting wire W2 adjacent to the conductor 13, the output current from the output terminal of the switching device 21 flows continuously through the first current path. Accordingly, the supply of power from the battery 10 to the switching device 21 is performed continuously.

As described above, if the current flow through the first current path is stopped, the output current flows through the second current path. If the current flow through the second current path is stopped, the output current flows continuously through the first current path. This leads to less possibility of stopping supply of power to the switching device 21.

Figure 5:
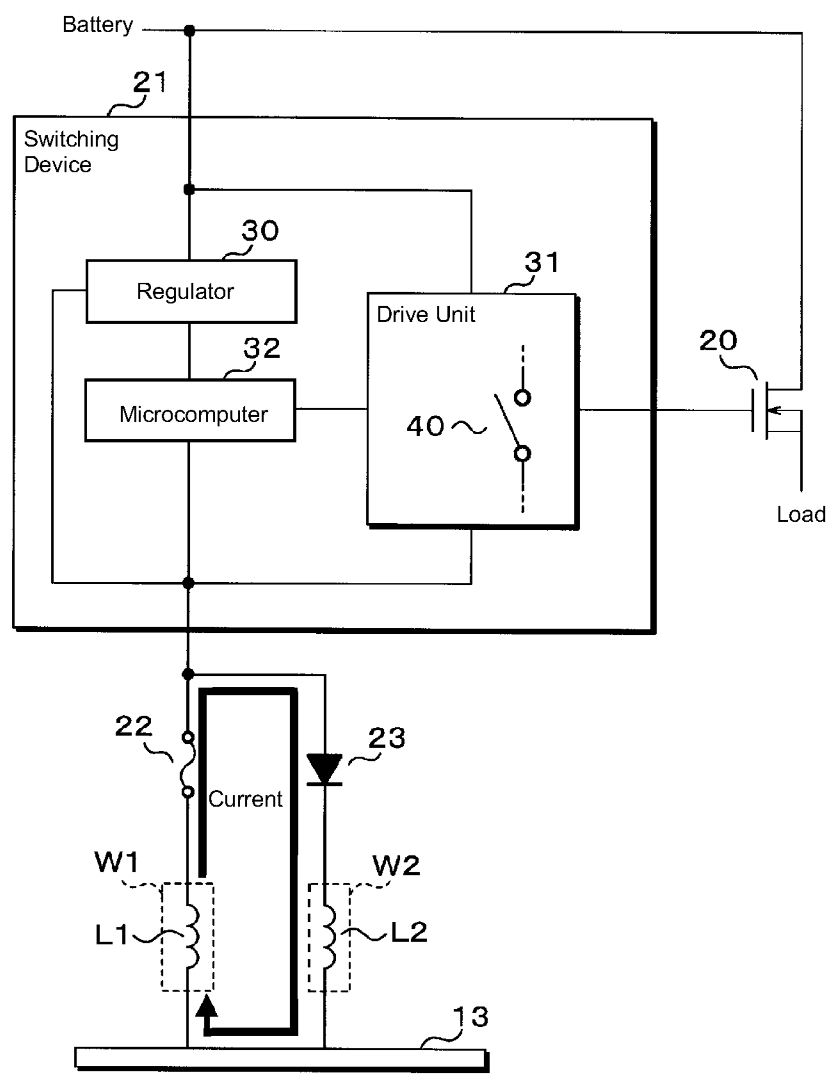
FIG. 5 is a diagram showing the operation of a diode.

FIG. 5 is a diagram showing the operation of the diode 23. As described above, when the one or more sub-switches 40 of the drive unit 31 perform switching, an output current from the output terminal of the switching device 21 changes. If the output current increases, the first inductor L1 of the first conducting wire W1 generates a surge voltage, and the voltage at the first conducting wire W1 on the side adjacent to the fuse 22 with respect to the potential on its end adjacent to the conductor 13 is raised. This results in the raised voltage at the output terminal of the switching device 21 with respect to the potential of the conductor 13.

The surge voltage becomes higher the larger the inductance of the first inductor L1 is. The inductance of the first inductor L1 depends on the shape of the first conducting wire W1 as it is disposed in a vehicle. The inductance of the first inductor L1 changes depending on whether or not the first conducting wire W1 is bent. Moreover, when the first conducting wire W1 is bent, the inductance of the first inductor L1 changes depending on the curvature at its bent portion. The shape of the first conducting wire W1 disposed in a vehicle changes when the vehicle moves, and accordingly, the inductance of the first inductor L1 also changes.

In the power supply system 1 as shown in FIG. 5, a current path is formed in which a current flows from the other end of the first conducting wire W1 to the fuse 22, the diode 23, the second conducting wire W2, the conductor 13, and the one end of the first conducting wire W1 in this order (hereinafter, referred to as "freewheeling current path"). The current flows through the freewheeling current path when the voltage at the output terminal of the switching device 21 with respect to the potential of the conductor 13 is raised to or above the forward voltage of the diode 23. This keeps the voltage at the output terminal of the switching device 21 with respect to the potential of the conductor 13 to the forward voltage of the diode 23, e.g., 0.7 V.

Consequently, even when the first inductor L1 of the first conducting wire W1 generates the surge voltage, the diode 23 keeps the voltage at the output terminal of the switching device 21 with respect to the potential of the conductor 13 to or below the forward voltage of the diode 23. Consequently, the surge voltage is suppressed to or below the forward voltage of the diode 23.

In the power supply system 1, the inductance of the first inductor L1 exceeds the inductance of the second inductor L2. That is, the inductive component of the first conducting wire W1 exceeds the inductive component of the second conducting wire W2. In this case, there is a high possibility that the voltage at the output terminal of the switching device 21 with respect to the potential of the conductor 13 is raised to or above the forward voltage of the diode 23, i.e., the current is particularly likely to flow through the freewheeling current path. Consequently, the power supply system 1 in which the inductive component of the first conducting wire W1 exceeds the inductive component of the second conducting wire W2 produces a significant effect of suppressing the surge voltage.

The inductance of the first inductor L1 is larger the thinner the first conducting wire W1 is, and is larger the longer the first conducting wire W1 is. Likewise, the inductance of the second inductor L2 is larger the thinner the second conducting wire W2 is, and is larger the longer the second conducting wire W2 is.

Figure 6:
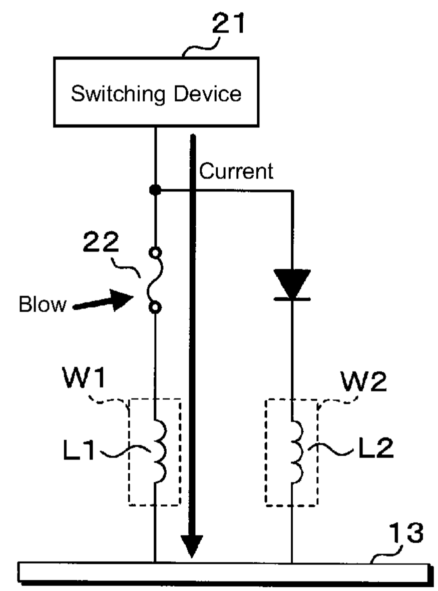
FIG. 6 is one diagram showing protection against overcurrent.

FIG. 6 is one diagram showing the protection against overcurrent. In the case where the output current from the output terminal of the switching device 21 flows through the first current path where the fuse 22 is arranged, the fuse 22 blows if the current flowing through the fuse 22, i.e., the output current increases to or above the first threshold. For this reason, no current that is equal to or higher than the first threshold can flow through the first current path.

Figure 7:
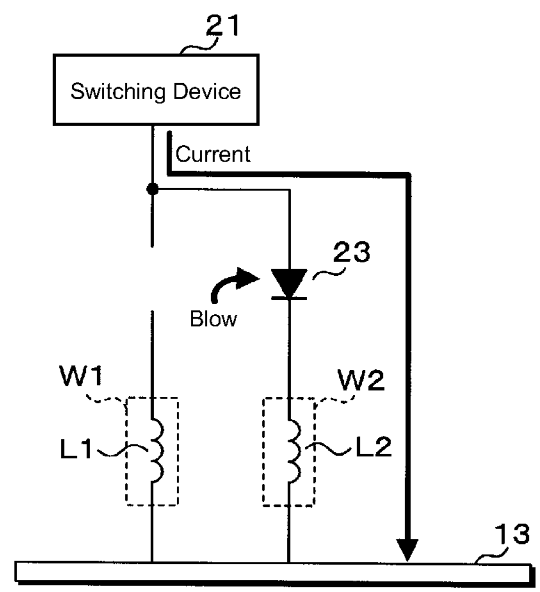
FIG. 7 is another diagram showing protection against overcurrent.

FIG. 7 is another diagram showing the protection against overcurrent. As described above, if the current flow through the first current path is stopped, the output current from the output terminal of the switching device 21 flows through the second current path where the diode 23 is arranged. For example, if the fuse 22 blows as shown in FIG. 7 or if the one end of the first conducting wire W1 adjacent to the conductor 13 is opened as shown in FIG. 3, the current flow through the first current path stops.

In the case where the output current flows through the second current path, the diode 23 blows if the current flowing through the diode 23, i.e., the output current increases to or above the second threshold. For this reason, no current that is equal to or higher than the second threshold can flow through the second current path.

As described above, since the fuse 22 is disposed in the first current path, no current that is equal to or higher than the first threshold can flow through the first current path. Moreover, since the diode 23 is disposed in the second current path, no current that is equal to or higher than the second threshold can flow through the second current path. Accordingly, the current flowing through the switching device 21 never exceeds the higher of the first threshold and the second threshold. This results in protection of the switching device 21 against overcurrent. Here, the first threshold may be equal to or different from the second threshold.

In order to protect the switching device 21 against overcurrent, a configuration is conceivable in which a fuse element is used, instead of the fuse 22 and the diode 23, that blows when a current flowing therethrough increases to or above a predetermined value. With this configuration, one end of the fuse element is connected to the output terminal of the switching device 21, and the other end of the fuse element is connected to the one end of the first conducting wire W1 and the second conducting wire W2. In this case, if an output current increases to or above a predetermined value or more, the fuse element blows. This results in prevention of overcurrent from flowing through the switching device 21.

However, if the fuse element blows due to some reason other than the increased output current from the switching device 21, e.g., due to vehicle vibration, power supply to the switching device 21 stops.

In the power supply system 1, when the fuse 22 blows due to a reason other than the increased output current from the switching device 21, the output current flows through the second current path. When the diode 23 blows due to a reason other than the increased output current from the switching device 21, the output current flows through the first current path. Accordingly, there is also less possibility of stopping the power supply to the switching device 21 due to a reason other than the increased output current from the switching device 21.

In the power supply control device 11, the diode 23 has a blowout function. Accordingly, there is no need to provide in the second current path any fuse element, such as a fuse, in addition to the diode 23, that is configured to blow when a current flowing therethrough increases to or above the predetermined value. This allows a reduction in the number of components constituting the power supply control device 11, achieving a reduction in size of the power supply control device 11.

Moreover, the inductance of the first inductor L1 may be equal to or less than the inductance of the second inductor L2. Moreover, instead of the diode 23, a series circuit formed by a diode without any blowout function and a fuse element may be used as a second fuse portion configured to blow when a current flowing therethrough increases to or above the second threshold. Furthermore, instead of the fuse 22, a fuse element such as a resistor element or a conducting wire configured to blow when a current flowing therethrough increases to or above the first threshold may be used. Also, the main switch 20 is not limited to the N-channel FET, but may be a P-channel FET, a bipolar transistor, or a relay contact.

Even in such a case as described above, there is less possibility of stopping supply of power to the switching device 21, and thus the surge voltage is suppressed to or below a forward voltage of the diode 23, leading prevention of overcurrent to the switching device 21.

The embodiments disclosed herein are to be considered in all respects as illustrative and not restrictive. It should be understood that the scope of the disclosure is not limited to the following examples, but is intended to encompass all variations and modifications indicated by, equivalent to, and falling within the appended claims.

The invention claimed is:

1. A power supply control device for controlling power supplied by a battery to a load via a switch by turning the switch on or off, the power supply control device and the load connected to a ground, the power supply control device comprising:

a switching device configured to turn the switch on or off, a first fuse portion that is disposed in a first current path of an output current, output from the switching device when power is supplied to the switching device, and is configured to blow if a current flowing therethrough increases to or above a first threshold, the first fuse portion is also connected to the ground; and a diode that is disposed in a second current path of the output current different from and in parallel to the first current path, and is configured to blow if a current flowing therethrough increases to or above a second threshold, wherein an anode of the diode is connected to the switching device via the second current path and a cathode of the diode is connected to the ground.

2. The power supply control device according to claim 1, wherein, if a current flowing via the diode increases to or above the second threshold, the diode blows.

3. The power supply control device according to claim 2, wherein a voltage between opposite ends of the first fuse portion when the output current flows through the first current path is lower than a voltage between opposite ends of the diode when a current flows through the diode in a forward direction.

4. The power supply control device according to claim 1, wherein a voltage between opposite ends of the first fuse portion when the output current flows through the first current path is lower than a voltage between opposite ends of the diode when a current flows through the diode in a forward direction.

5. The power supply control device according to claim 4, wherein a first conducting wire and a second conducting wire are arranged in the first current path and the second current path, respectively, and an inductive component of the first conducting wire is larger than an inductive component of the second conducting wire.

6. The power supply control device according to claim 1, wherein a first conducting wire and a second conducting wire are arranged in the first current path and the second current path, respectively, and an inductive component of the first conducting wire is larger than an inductive component of the second conducting wire.

* * * * *